United States Patent
Zelβmann et al.

(10) Patent No.: US 8,495,863 B2
(45) Date of Patent: Jul. 30, 2013

(54) TANK VENTILATION DEVICE AND ASSOCIATED OPERATING METHOD

(75) Inventors: Hagen Zelβmann, Herrenberg (DE); Martin Klöpfer, Winnenden (DE)

(73) Assignee: Mahle International GmbH (DE)

( * ) Notice: Subject to any disclaimer, the term of this patent is extended or adjusted under 35 U.S.C. 154(b) by 594 days.

(21) Appl. No.: 12/490,814

(22) Filed: Jun. 24, 2009

(65) Prior Publication Data

US 2009/0320926 A1    Dec. 31, 2009

(30) Foreign Application Priority Data

Jun. 25, 2008  (DE) .......................... 10 2008 030 196

(51) Int. Cl.
*F01N 3/00*    (2006.01)

(52) U.S. Cl.
USPC .................. 60/283; 60/274; 60/275; 60/297

(58) Field of Classification Search
USPC .................. 60/283, 286, 295, 297, 300, 311, 60/274, 275
See application file for complete search history.

(56) References Cited

U.S. PATENT DOCUMENTS

| | | | | |
|---|---|---|---|---|
| 5,207,734 A | * | 5/1993 | Day et al. | 60/278 |
| 6,463,889 B2 | * | 10/2002 | Reddy | 123/3 |
| 6,550,238 B2 | * | 4/2003 | Andorf et al. | 60/283 |
| 2002/0056269 A1 | | 5/2002 | Andorf et al. | |

FOREIGN PATENT DOCUMENTS

| | | |
|---|---|---|
| DE | 19720893 | 12/1997 |
| DE | 10040125 | 2/2002 |

OTHER PUBLICATIONS

English abstract for DE-19720893.

* cited by examiner

*Primary Examiner* — Binh Q Tran
*Assistant Examiner* — Diem Tran
(74) *Attorney, Agent, or Firm* — Rader, Fishman & Grauer PLLC

(57) ABSTRACT

The present invention relates to a tank ventilation device (1) for a motor vehicle, with at least one storage device (2) for storing hydrocarbon gas, the tank connection (9) of which is connected via a ventilation line (12) to a fuel tank (5) of a vehicle, the engine connection (10) of which is connected via a regeneration line (13) to a fresh gas system (6) of an internal combustion engine (4) of the vehicle, and the environment connection (11) of which communicates via an environment line (15) with the environment (7) of the vehicle.

Figure 1:
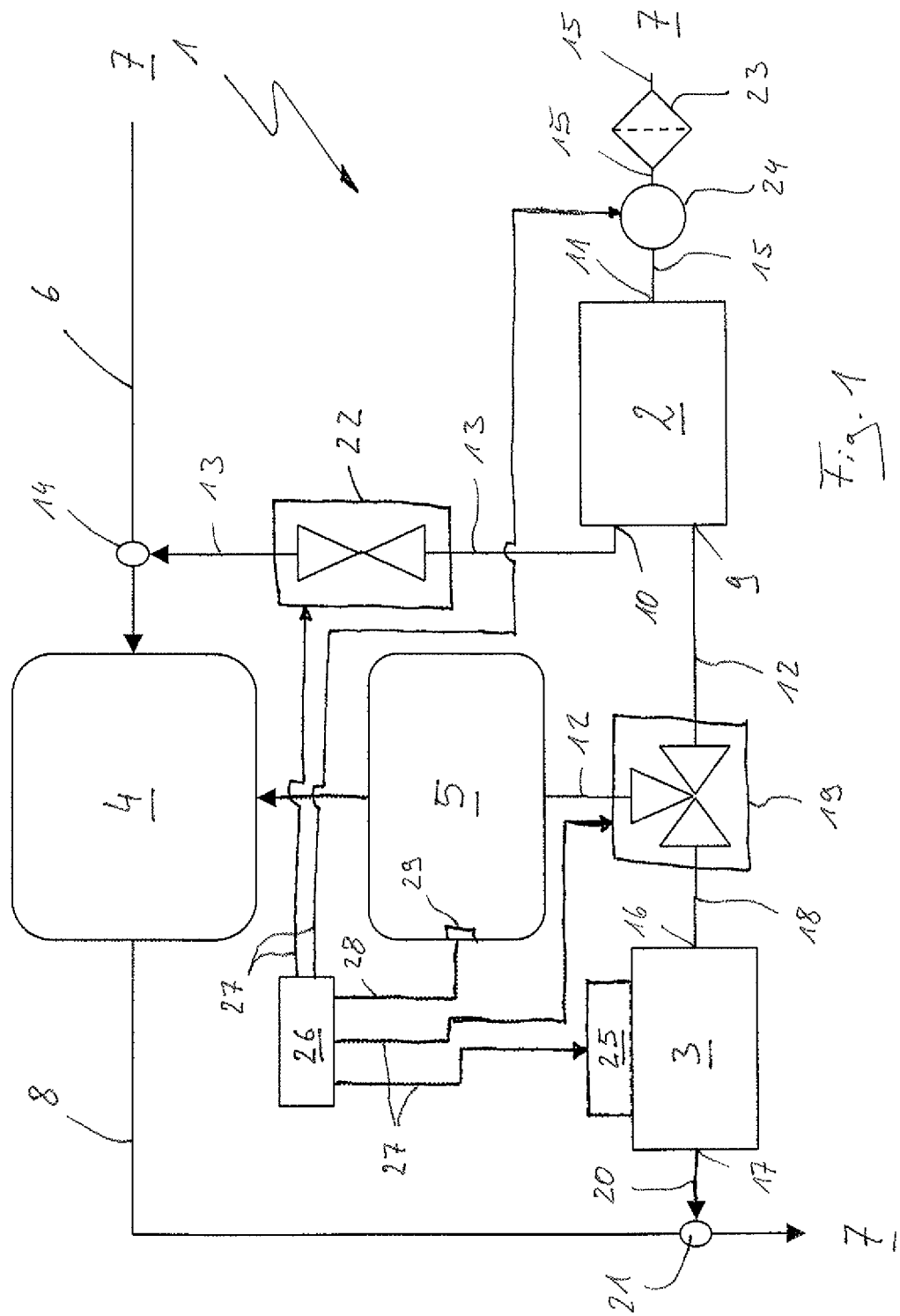

In order to reduce hydrocarbon emissions, at least one conversion device (3) can be provided, which is used for materially converting hydrocarbon gas and is connected directly or indirectly to the fuel tank (5) via a feed line (18) on the input side.

22 Claims, 5 Drawing Sheets

TANK VENTILATION DEVICE AND ASSOCIATED OPERATING METHOD

CROSS-REFERENCES TO RELATED APPLICATION

This application claims priority to German patent application DE 10 2008 030 196.5 filed on Jun. 25, 2008, which is hereby incorporated by reference in its entirety.

The present invention relates to a tank ventilation device for a motor vehicle. The invention also relates to a method for operating a tank ventilation device of a motor vehicle.

For environmental protection reasons, modern motor vehicles have a tank ventilation device which has a storage device, with the aid of which hydrocarbon gas can be stored. This storage device, which can in particular be an active carbon filter, is attached to a fuel tank of the vehicle by means of a tank connection. When the internal combustion engine is switched off, hydrocarbon gas which forms in the fuel tank can be ventilated via the storage device, with the hydrocarbons being absorbed in the storage device. When the internal combustion engine is subsequently operated, some of the ambient air is sucked in via the storage device, as a result of which the storage device is flushed and the hydrocarbons which have accumulated therein are desorbed.

Stricter environmental legislation in certain states now also demands that even during vehicle refueling hydrocarbon gas which is pushed out of the fuel tank which is being filled should not reach the environment. To this end, it is possible for example to guide the hydrocarbon gas which escapes from the tank through the storage device during refueling too, by means of complex line systems. To this end, the storage device must have correspondingly large dimensions. Alternatively, an additional storage device can be necessary for this purpose. Furthermore, the need arises for storage devices of different sizes for different vehicle types, depending on whether refueling should be taken into account or not.

The present invention is concerned with the problem of specifying an improved embodiment for a tank ventilation device and for an associated operating method, which embodiment is characterised in particular in that it manages with comparatively little installation space and/or that it makes possible a uniform type of construction for the tank ventilation device for different sizes of tank.

This problem is solved according to the invention by the subject matter of the independent claims. Advantageous embodiments form the subject matter of the dependent claims.

The invention is based on the general idea of providing a conversion device for refueling, in which the hydrocarbon gas which is pushed out of the fuel tank during refueling can be materially converted, in particular by oxidation. The conversion of the hydrocarbons which are released during refueling means that it is no longer necessary to store them, as a result of which a storage device provided for this purpose can be omitted. The invention proposes a functional separation between refueling and standard ventilation, with it being possible for the conventional storage device to be operated during standard ventilation, while the material conversion is used during refueling.

As the hydrocarbon gas flow during refueling is comparatively small, the conversion device can be dimensioned to be correspondingly small. In any case, such a conversion device takes up much less installation space than a storage device, which would be necessary to store the amount of hydrocarbon gas which is released during refueling. Furthermore, the tank ventilation device can be realised with the aid of the separate conversion device, largely irrespective of whether refueling must be taken into account or not. This means that a modular construction is produced in which the "conversion device" module can be provided or omitted depending on the desire to take refueling into account. This means that the number of different variants can be reduced. Correspondingly, the manufacturing costs for the ventilation device can be reduced.

According to an advantageous embodiment, the conversion device can have a catalytic converter or be formed by one. A catalytic conversion of the hydrocarbon gas then takes place in the catalytic converter, with air as the oxidiser. Such a catalytic converter can take up a relatively small amount of space compared to a catalytic converter in an exhaust system, as the volumetric flow of hydrocarbon gas which arises during refueling is much smaller than the amount of exhaust produced when the internal combustion engine is under full load, on the basis of which an exhaust catalytic converter is to be designed.

The conversion device can be part of a fuel cell system. This means that the hydrocarbon gas which is released during refueling can be used directly or indirectly for generating electrical current. Such an embodiment is of increased interest in particular if the vehicle is equipped with a fuel cell system anyway. This means that a sensible use of the hydrocarbon gas which is released during refueling can be realised.

Further important features and advantages of the invention can be found in the subclaims, the drawings and the associated description of the figures using the drawings.

It is self-evident that the features which are mentioned above and those which are still to be explained below can be used not only in the combination specified in each case, but also in other combinations or alone without departing from the framework of the present invention.

Preferred exemplary embodiments of the invention are shown in the drawings and are explained in more detail in the following description, with the same reference symbols referring to the same or similar or functionally identical components.

In the figures,

FIG. 1 schematically shows a highly simplified, circuit diagram type basic outline of a tank ventilation device, FIG. 2 to 5 schematically show views as in FIG. 1, but during different operating states.

According to FIG. 1 to 5, a tank ventilation device 1 comprises a storage device 2 and a conversion device 3. The ventilation device 1 is arranged in a motor vehicle which has an internal combustion engine 4 and a fuel tank 5. The internal combustion engine 4 is operated with a hydrocarbon which is generally liquid, such as petrol, diesel, biodiesel or other synthetic fuels. The internal combustion engine 4 is supplied with fresh gas, which is generally air, from the environment 7 by means of a fresh gas system 6. Components with which such a fresh gas system 6 is usually fitted, such as an air filter or a charging device, are not shown here. An exhaust system 8 is also provided, with the aid of which combustion exhausts can be guided away from the internal combustion engine 4 to the environment 7. In this case, too, components which such an exhaust system 8 usually contains, such as catalytic converters, particulate filters, silencers, are not shown.

The storage device 2 is configured for storing hydrocarbon gas. For example, the storage device 2 can have an active carbon filter or be formed by one for this purpose. In principle, however, other storage devices are also conceivable. The storage device 2 has a tank connection 9, an engine connection 10 and an environment connection 11. The tank connection 9 is connected to the fuel tank 5 by means of a ventilation line 12. The engine connection 10 is connected to the fresh gas system 6 by means of a regeneration line 13. A corresponding connection point is indicated herewith 14. The environment connection 11 is connected to the environment 7 by means of an environment line 15.

The conversion device 3 has an input connection 16 and an output connection 17. The conversion device 3 is connected on the input side to the tank 5 by means of a feed line 18. In the present case, the connection to the tank 5 takes place indirectly by means of a control valve 19 which is arranged in the ventilation line 12. In principle, an embodiment is also conceivable in which the feed line 18 is connected directly to the tank 5, that is, in addition to or separate from the ventilation line 12. Furthermore, the conversion device 3 is connected on the output side to the environment 7 by means of a discharge line 20. In the example the discharge line 20 is connected to the exhaust system 8 for this purpose. A corresponding connection point is indicated here with 21. Correspondingly, the reaction products of the conversion device 3 are conducted to the environment 7 indirectly, that is, via part of the exhaust system 8. This means in particular that exhaust cleaning systems in the exhaust system 8 can be used.

The control valve 19 which is arranged in the ventilation line 12 is configured in such a manner that it has at least two switch positions. In the first switch position, which is symbolised in FIGS. 2, 3 and 5 by I, the control valve 19 connects the tank 5 with the storage device 2. In this first switch position I the connection of the control valve 19 to the conversion device 3 is blocked. In the second switch position, which is symbolised in FIG. 4 by II, the control valve 19 connects the tank 5 with the conversion device 3. In this second switch position II the connection of the control valve 19 to the storage device 2 is blocked. To this extent the control valve 19 is preferably a two-way valve. In principle, other embodiments of such a control valve 19 are also conceivable.

A check valve 22 is arranged in the regeneration line 19, with the aid of which the regeneration line 19 can be blocked and opened. The environment line 15 contains here purely by way of example a filter device 23, with the aid of which air, which is sucked in from the environment 7 when the storage device 2 is flushed, can be filtered. This is particularly advantageous if the regeneration line 13 is connected to the fresh gas system 6 downstream of a filter device which is arranged in the fresh gas system 6. In the example, the environment line 15 also contains a diagnostic pump 24, which can be switched at least between an active state and a passive state. In the passive state, the diagnostic pump 24 can be flowed through in both directions, in particular with a comparatively low flow resistance. In the active state, the diagnostic pump 24 conveys air from the environment 7 in the direction of the storage device 2.

The conversion device 3 is configured in such a manner that it can be used to materially convert hydrocarbons. The conversion device 3 is preferably a catalytic converter which can convert hydrocarbons catalytically with a corresponding oxidiser, preferably air. For example, hydrocarbons are converted to carbon dioxide and water in the conversion device 3. The conversion device 3 can likewise be configured in such a manner that it has a burner. The conversion device 3 can also be part of a fuel cell system, so that the hydrocarbons can be used directly or indirectly to generate electrical current. For example, the conversion device 3 is a reformer of a fuel cell system, which generates a hydrogen-containing synthesis gas from the hydrocarbons by partial oxidation, which synthesis gas can be converted to electricity in a fuel cell using a corresponding electrolyte. A reformer of this type operates in particular with a catalytic converter for this purpose.

The ventilation device 1 can expediently be equipped with a heating device 25, with the aid of which the conversion device 3 can be heated to a suitable operating temperature.

As long as the conversion device 3 has a catalytic converter or is formed by one, the heating device 25 can be used to heat the catalytic converter or the conversion device 3 to the activation temperature of the catalyst. The heating device 25 can operate in particular electrically for this purpose.

The ventilation device 1 is moreover equipped with a control device 26 which is connected by means of corresponding control lines 27 to the controllable components of the ventilation device 1. For example, the control device 26 is connected by means of control lines 27 to the heating device 25, the control valve 19, the check valve 22 and the diagnostic pump 24 in order to be able to actuate the said components. Furthermore, the control device 26 can be connected by means of a corresponding signal line 28 to a pressure sensor 29 for example, which detects the pressure in the fuel tank 5.

Figure 2:
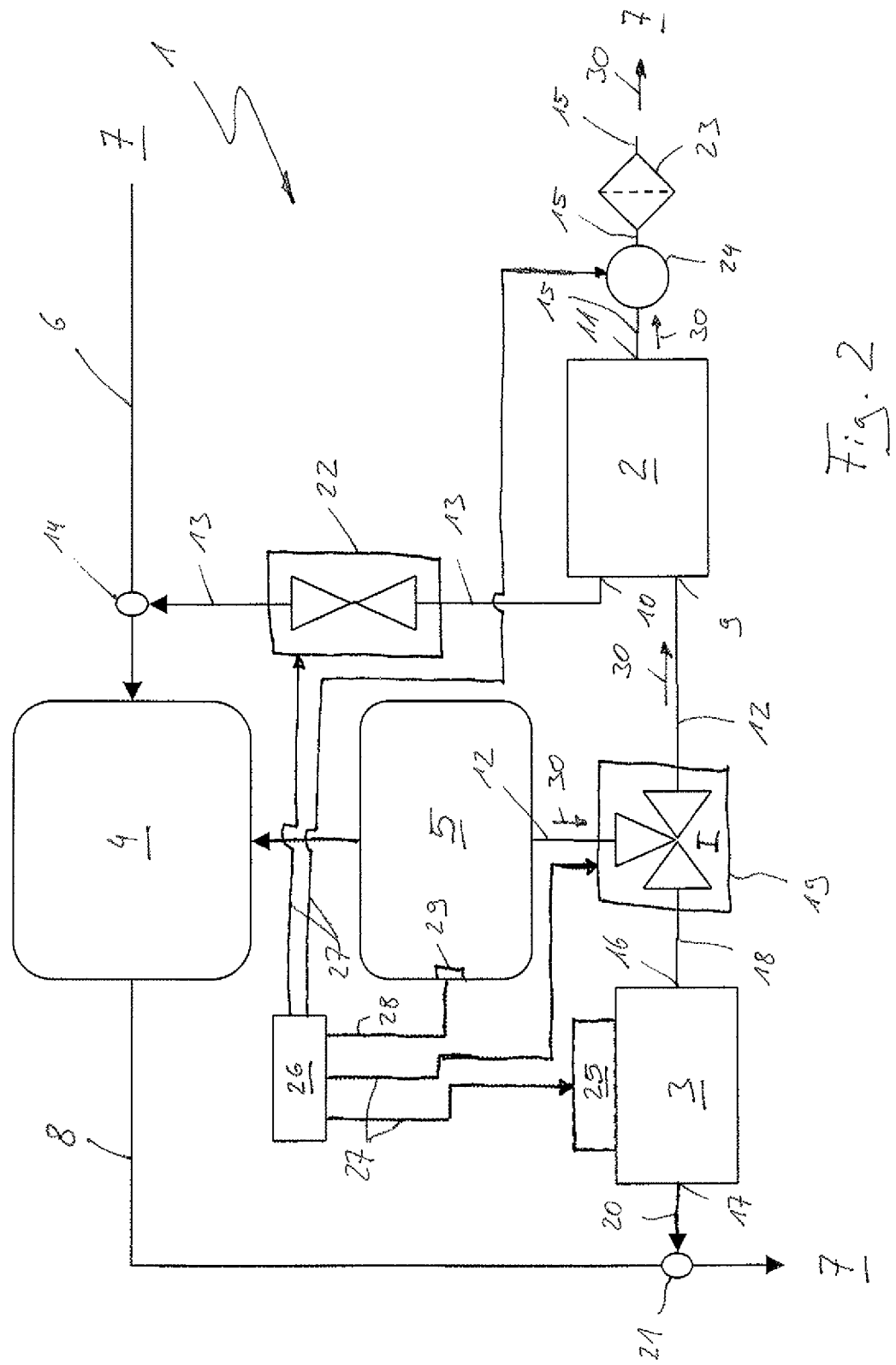

The tank ventilation device 1 can be operated in particular as follows:

FIG. 2 shows the standard ventilation case, which is set when the internal combustion engine 4 is switched off. To this end, the control valve 19 is switched to its first switch position I. As a result, gas can get out of the tank 5 via the ventilation line 12 through the control valve 19 to the storage device 2 and via the environment line 15 through the diagnostic pump 24 and through the air filter 23 into the environment 7 according to arrows 30. Hydrocarbons which are entailed in the gas are absorbed in the storage device 2.

In this ventilation mode, the check valve 22 is switched in such a manner that it assumes its blocking position.

Figure 3:
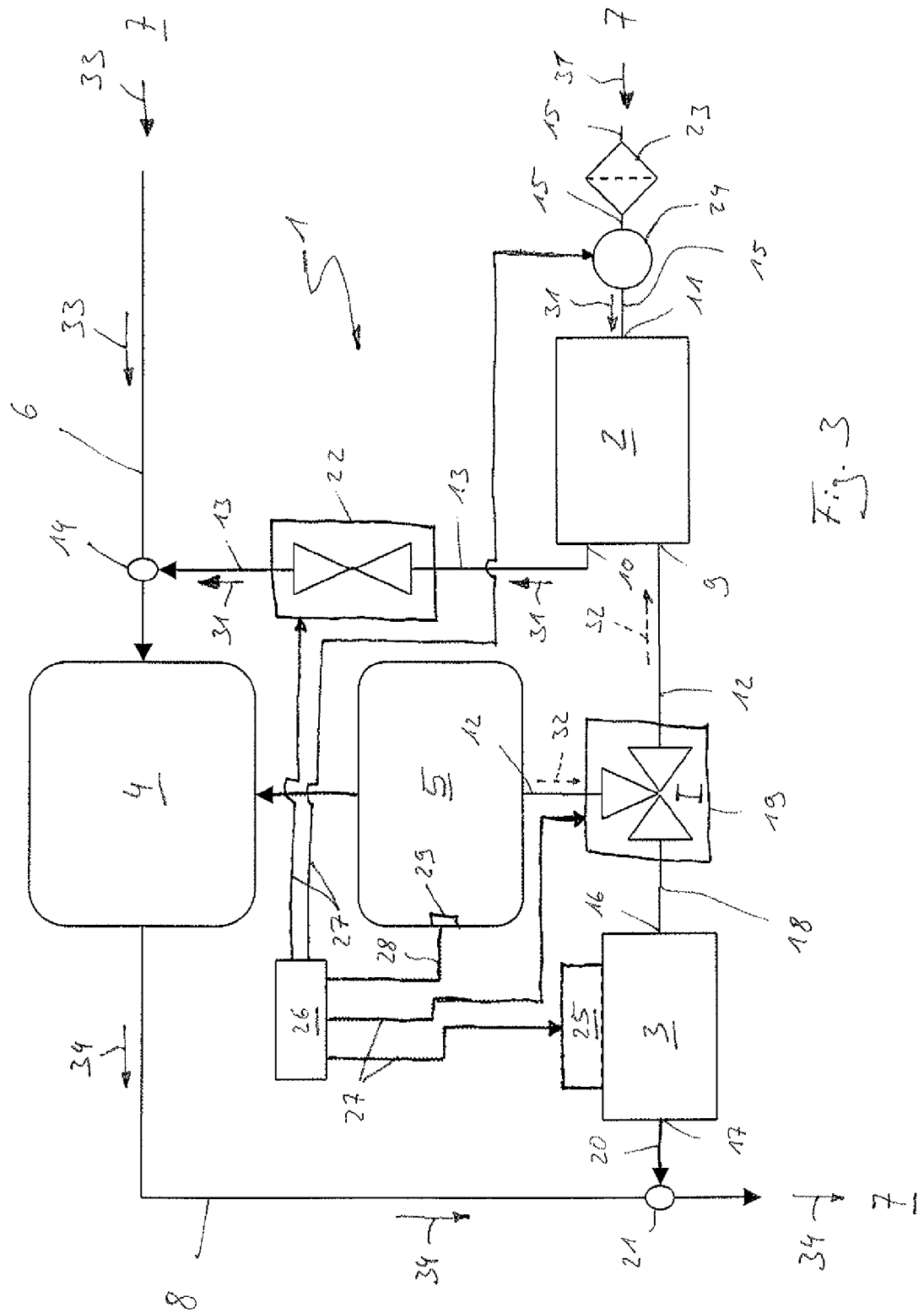

FIG. 3 shows normal operation of the internal combustion engine 4, in which the storage device 2 is regenerated. To this end, some of the fresh gas which is required by the internal combustion engine 4 is sucked in via the regeneration line 13. This means that a predefined air flow flows from the environment 7 via the environment line 15 through the air filter 23 and through the diagnostic pump 24 to the storage device 2, and from the latter via the regeneration line 13 through the check valve 22 to the fresh gas system 6, according to arrows 31. Arrows 32 drawn with dashed lines indicate a gas path, through which hydrocarbon-containing gas can get from the tank 5 to the storage device 2 as before. Arrows 33 symbolise the main fresh gas flow from the environment 7 through the fresh gas system 6 to the internal combustion engine 4. Other arrows 34 symbolise the exhaust flow from the internal combustion engine 4 to the environment 7.

When air flows through the storage device 2, the hydrocarbons which have accumulated there are released or desorbed, as a result of which the storage device 2 is regenerated.

For this regeneration mode, the control valve 19 has its first switch state I again, while the check valve 22 now assumes its open position.

Figure 4:
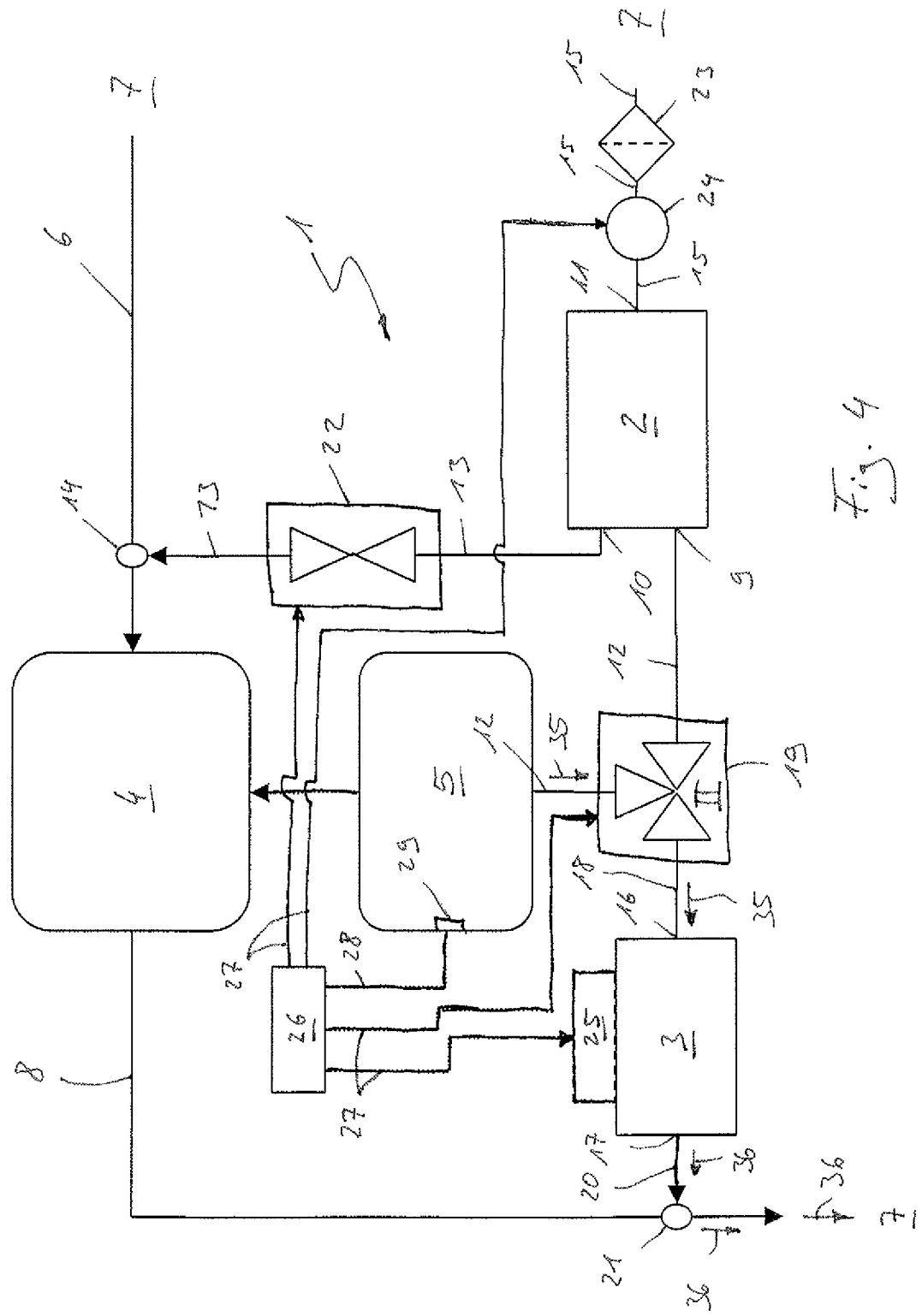

FIG. 4 now shows refueling. When the vehicle or the tank 5 is refueled, the check valve 22 is switched into its blocking position. The control valve 19 is switched into its second switch position II. During refueling, the internal combustion engine 4 is usually switched off, which is however not absolutely necessary for the functioning of the tank ventilation device 1 or for the associated operating method. In order to prepare for refueling, the control device 26 can for example activate the heating device 25 for heating the conversion device 3. The control device 26 can recognise refueling for example by a tank cap being opened. During refueling, the tank 5 fills with liquid fuel, as a result of which the volume consisting of air and gaseous fuel contained therein is pushed out. This can get via part of the ventilation line 12 via the control valve 19 to the feed line 18, and via the latter to the conversion device 3. In the conversion device 3, the material conversion of the hydrocarbon gas takes place, for example by catalytic combustion. The gas path from the tank 5 to the conversion device 3 is indicated here by arrows 35. The reaction products which arise during the material conversion in the conversion device 3 are conducted via the discharge line 20 and part of the exhaust system 8 to the environment 7 according to arrows 36.

Figure 5:
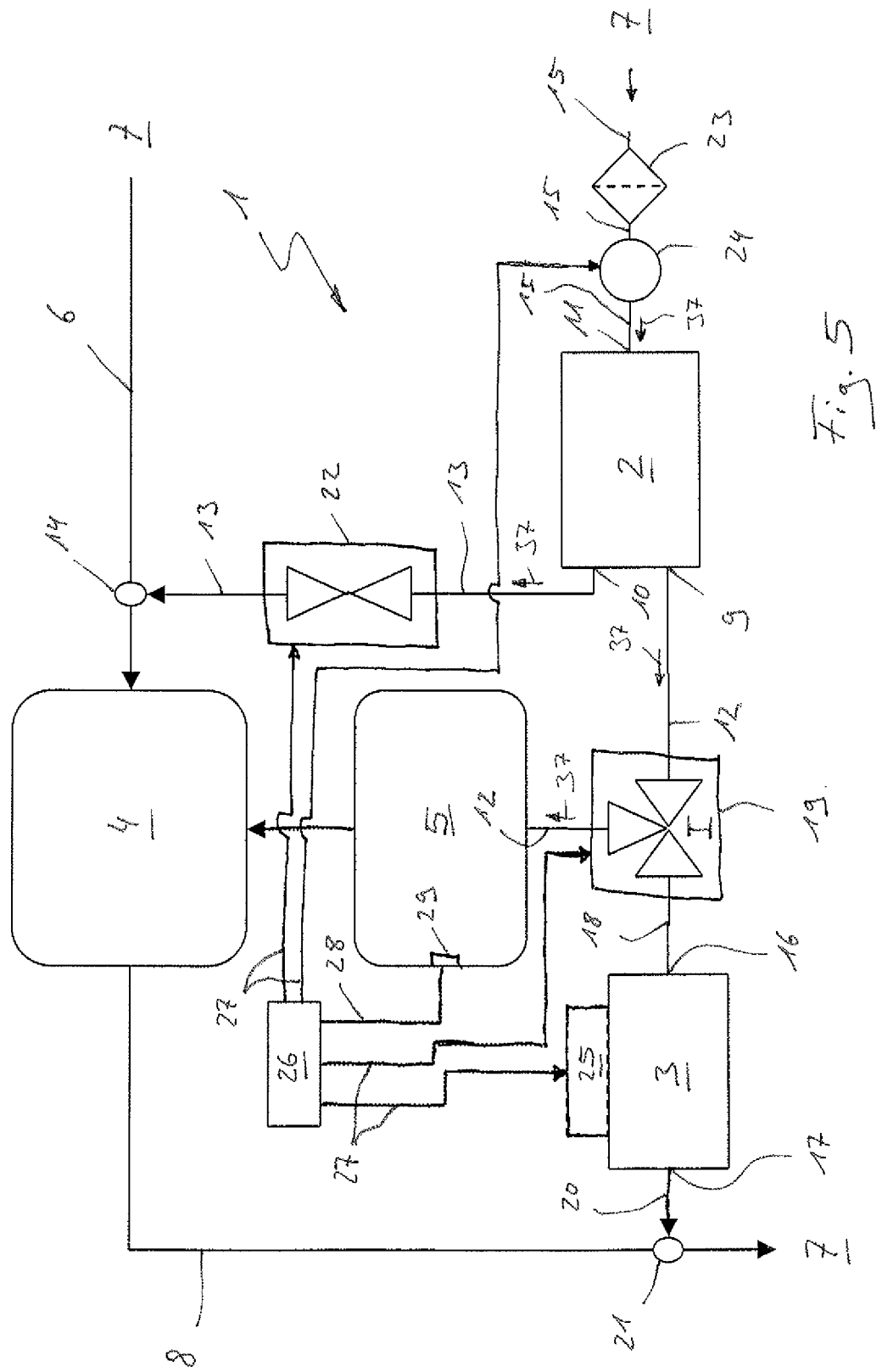

FIG. 5 shows a diagnostic state, in which the ventilation device 1 can automatically carry out diagnostics, what are know as on-board diagnostics (OBD), of the relevant components. For these diagnostics, which can be carried out when the internal combustion engine 4 is switched on or off, the control valve 19 is switched into its first switch position I and the check valve 22 is switched into its blocking position. Furthermore, the diagnostic pump 24 is activated so that it sucks in air from the environment 7 and conveys it in the direction of the storage device 2. This increases the pressure downstream of the diagnostic pump 24. Correspondingly, the pressure-tightness can be checked in the tank 5, the ventilation line 12, the storage device 2, the control valve 19, the check valve 22, the regeneration line 13 as far as the check valve 22 and the environment line 15 between the storage device 2 and the diagnostic pump 24. The gas flow for building up the diagnostic pressure is indicated in FIG. 5 by arrows 37. The achievement of the diagnostic pressure can be monitored by the control device 26 by means of the pressure sensor 29.

In order to realise the above-described modes, that is, to carry out the operating method, the control device 26 is configured correspondingly, in particular programmed.

LIST OF REFERENCE SYMBOLS

1 Tank ventilation device
2 Storage device
3 Conversion device
4 Internal combustion engine
5 Fuel tank
6 Fresh gas system
7 Environment
8 Exhaust system
9 Tank connection
10 Engine connection
11 Environment connection
12 Ventilation line
13 Regeneration line
14 Connection point
15 Environment line
16 Input
17 Output
18 Feed line
19 Control valve
20 Discharge line
21 Connection point
22 Check valve
23 Air filter
24 Diagnostic pump
25 Heating device
26 Control device
27 Control line
28 Signal line
29 Pressure sensor
30 Ventilation gas path
31 Flushing gas path
32 Ventilation gas path
33 Main fresh gas path
34 Exhaust path
35 Ventilation gas path
36 Exhaust path
37 Pressure buildup path

The invention claimed is:

1. A tank ventilation device for a motor vehicle, comprising:
    at least one storage device for storing hydrocarbon gas,
    a tank connection, a ventilation line and a fuel tank, the tank connection connected via the ventilation line to the fuel tank of a vehicle,
    an engine connection, a regeneration line and a fresh gas system, the engine connection connected via the regeneration line to the fresh gas system of an internal combustion engine of the vehicle,
    an environment connection and an environment line, wherein the environment connection communicates via the environment line with an environment of the vehicle,
    at least one conversion device for materially converting hydrocarbon gas, which device is connected one of directly and indirectly to the fuel tank via a feed line on an input side, and
    a control valve connecting the ventilation line to the feed line, which control valve is adapted to block hydrocarbon gas flow from the fuel tank to the conversion device and permit hydrocarbon gas flow from the fuel tank to the storage device during standard ventilation, which control valve is further adapted to permit hydrocarbon gas flow from the fuel tank to the conversion device and block hydrocarbon gas flow from the fuel tank to the storage device during refueling.

2. The tank ventilation device according to claim 1, wherein the conversion device is part of a fuel cell system.

3. The tank ventilation device according to claim 1, wherein the conversion device is connected on an output side to an exhaust system of the internal combustion engine by means of a discharge line.

4. The tank ventilation device according to claim 1, wherein a heating device is provided for heating the conversion device.

5. The tank ventilation device according to claim 1, wherein the storage device comprises an active carbon filter.

6. The tank ventilation device according to claim 1, wherein one of the following is selected: i. the conversion device has a catalytic converter; and ii. the conversion device is formed by a catalytic converter.

7. The tank ventilation device according to claim 6, wherein the conversion device is part of a fuel cell system.

8. The tank ventilation device according to claim 6, wherein the conversion device is connected on an output side to an exhaust system of the internal combustion engine by means of a discharge line.

9. The tank ventilation device according to claim 6, wherein a heating device is provided for heating the conversion device.

10. A method for operating a tank ventilation device of a motor vehicle, comprising:
    ventilating a fuel tank into an environment of the vehicle via a storage device for storing hydrocarbon gas when an internal combustion engine of the vehicle is switched off,
    regenerating the storage device by flushing air, which is sucked in from the environment through the storage device into a fresh gas system of the internal combustion engine when the internal combustion engine is switched on, and during refueling, guiding hydrocarbon gas from the fuel tank to a conversion device while blocking hydrocarbon gas from flowing from the fuel tank to the storage device, and materially converting the hydrocarbon gas in the conversion device.

11. The method according to claim 10, comprising guiding reaction products produced during conversion from the conversion device to an exhaust system of the internal combustion engine.

12. The method according to claim 10, comprising heating the conversion device up to an operating temperature before conversion of the hydrocarbon gas.

13. The method according to claim 10, wherein a control device is provided for operating the tank ventilation device.

14. The method according to claim 10, comprising converting the hydrocarbon gas catalytically in the conversion device during refueling.

15. The method according to claim 14, wherein the hydrocarbon gas is converted one of directly and indirectly by conversion to electricity in the conversion device during refueling.

16. The method according to claim 14, comprising guiding reaction products produced during conversion from the conversion device to an exhaust system of the internal combustion engine.

17. The method according to claim 14, comprising heating the conversion device up to an operating temperature before conversion of the hydrocarbon gas.

18. The method according to claim 10, wherein the hydrocarbon gas is converted one of directly and indirectly by conversion to electricity in the conversion device during refueling.

19. The method according to claim 18, comprising guiding reaction products produced during conversion from the conversion device to an exhaust system of the internal combustion engine.

20. A tank ventilation device for a motor vehicle, comprising:
- at least one storage device for storing hydrocarbon gas,
- a tank connection, a ventilation line and a fuel tank, the tank connection connected via the ventilation line to the fuel tank of a vehicle,
- an engine connection, a regeneration line and a fresh gas system, the engine connection connected via the regeneration line to the fresh gas system of an internal combustion engine of the vehicle, where the fresh gas system connects to the regeneration line at a connection point, and where fresh gas is sucked in from the environment through the fresh gas system,
- an environment connection and an environment line, wherein the environment connection communicates via the environment line with an environment of the vehicle, and
- at least one conversion device for materially converting hydrocarbon gas, which device is connected one of directly and indirectly to the fuel tank via a feed line on an input side, which device is part of a fuel cell system, and wherein the hydrocarbon gas is fed to the conversion device and conversion products are discharged therefrom during refueling of the vehicle.

21. A method for operating a tank ventilation device of a motor vehicle, comprising:
- ventilating a fuel tank into an environment of the vehicle via a storage device for storing hydrocarbon gas when an internal combustion engine of the vehicle is switched off,
- regenerating the storage device by flushing air, which is sucked in from the environment through the storage device into a fresh gas system of the internal combustion engine when the internal combustion engine is switched on,
- guiding hydrocarbon gas from the fuel tank to a conversion device and materially converting therein when the fuel tank is being filled, and
- directly or indirectly converting the hydrocarbon gas to electricity in the conversion device during refueling.

22. The method according to claim 21, comprising guiding reaction products produced during conversion from the conversion device to an exhaust system of the internal combustion engine.

* * * * *